United States Patent
Jokela

(10) Patent No.: US 11,184,410 B2
(45) Date of Patent: Nov. 23, 2021

(54) COMMUNICATION MANAGEMENT

(71) Applicant: Telia Company AB, Solna (SE)

(72) Inventor: Harri Jokela, Helsinki (FI)

(73) Assignee: TELIA COMPANY AB, Solna (SE)

( * ) Notice: Subject to any disclaimer, the term of this patent is extended or adjusted under 35 U.S.C. 154(b) by 7 days.

(21) Appl. No.: 16/406,378

(22) Filed: May 8, 2019

(65) Prior Publication Data

US 2019/0349408 A1    Nov. 14, 2019

(30) Foreign Application Priority Data

May 8, 2018    (FI) ..................................... 20185419

(51) Int. Cl.
  *H04L 29/06*    (2006.01)
  *H04M 7/00*    (2006.01)

(52) U.S. Cl.
  CPC ........ *H04L 65/1069* (2013.01); *H04L 65/608* (2013.01); *H04M 7/006* (2013.01)

(58) Field of Classification Search
  CPC .... H04M 7/006; H04L 67/02; H04L 65/1069; H04L 65/608; H04L 65/1059; H04L 65/1086; H04L 65/4023
  See application file for complete search history.

(56) References Cited

U.S. PATENT DOCUMENTS

| | | | | |
|---|---|---|---|---|
| 2005/0152338 A1* | 7/2005 | Chen | .................... | H04Q 3/0016 370/352 |
| 2011/0103305 A1* | 5/2011 | Ali | ....................... | H04W 76/32 370/328 |
| 2015/0029296 A1* | 1/2015 | Ni | ......................... | H04N 7/148 348/14.01 |
| 2015/0121250 A1 | 4/2015 | Waxman et al. | | |
| 2015/0280963 A1 | 10/2015 | Bollapalli et al. | | |
| 2016/0353330 A1* | 12/2016 | Naik | .................... | H04L 65/1016 |
| 2016/0366189 A1 | 12/2016 | Hart et al. | | |
| 2017/0195376 A1* | 7/2017 | Terpstra | .............. | H04L 65/1093 |

FOREIGN PATENT DOCUMENTS

| | | |
|---|---|---|
| EP | 2865160 | 4/2015 |
| WO | 2013/192509 A2 | 12/2013 |
| WO | 2013/192509 A3 | 12/2013 |
| WO | WO 2015/038997 | 3/2015 |
| WO | WO 2016/178090 | 11/2016 |

OTHER PUBLICATIONS

Finnish Search Report, FI 20185419 dated Nov. 6, 2018.
European Search Report for Application No. 19 17 2449 dated Jun. 25, 2019.

* cited by examiner

*Primary Examiner* — Rina C Pancholi
(74) *Attorney, Agent, or Firm* — Nixon & Vanderhye

(57) ABSTRACT

Disclosed is a method for managing a communication of a terminal device. In the method it is determined if the terminal device executes an active communication connection carrying voice data over a public switched telephone network, in response to a determination that the terminal device executes the active communication connection inactivating a voice portion of a communication session over a communication network implementing IP based communication, and in response to a determination that the terminal device does not execute the active communication connection activating the voice portion of the communication session over the communication network implementing IP based communication. Also disclosed is a terminal device, a computer program product and a system.

13 Claims, 2 Drawing Sheets

COMMUNICATION MANAGEMENT

TECHNICAL FIELD

The invention concerns in general the technical field of telecommunications. More particularly, the invention concerns a management of communication of a terminal device.

BACKGROUND

Terminal devices today are sophisticated devices suitable for managing connections of different types. For example, a mobile terminal may be configured to support communication technologies of mobile communication networks, such as GSM, 3G, 4G and so on. Furthermore, the same device may support so called IP (Internet protocol) based communication towards another network, such as to Internet.

The above described capabilities of the terminal devices enable a development of services utilizing one or more of the mentioned connections. For example, it may be arranged that one service, or application executed in the terminal device, may utilize a plurality of connections e.g. for a voice call. In other words, the voice call may be carried over a public switched telephone network (PSTN), such as a mobile communication network implementing 3G technology, or the voice call may be carried over IP as a so-called multimedia call. The multimedia call may be implemented with a specific technology in order to facilitate an efficiency and/or user experience. An applicable technology for the multimedia calls may be Web Real-Time Communication (WebRTC) technology.

However, the existing mechanisms for voice call management have a deficiency that the mechanisms for establishing the voice call operate without intelligence. In other words, they do not take into account efficiently enough if there is an active voice call already in place when another connection establishment it to be carried out. Hence, there is need to develop solutions for meeting demands of modern communication mechanisms in more appropriate way.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a terminal device, a computer program product and a system for managing a communication.

The objectives of the invention are reached by a method, a terminal device, a computer program product and a system as defined by the respective independent claims.

According to a first aspect, a method for managing a communication of a terminal device is provided, the method comprises: determining if the terminal device executes an active communication connection carrying voice data over a public switched telephone network; in response to a determination that the terminal device executes the active communication connection carrying voice data inactivating a voice portion of a communication session over a communication network implementing IP based communication; in response to a determination that the terminal device does not execute the active communication connection carrying voice data activating the voice portion of the communication session over the communication network implementing IP based communication.

An inactivation of the voice portion of the communication session over the communication network implementing IP based communication may comprise a muting of a voice channel in the communication session.

Alternatively or in addition, an inactivation of the voice portion of the communication session over the communication network implementing IP based communication may comprise disabling a voice channel in the communication session.

The determination if the terminal device executes an active communication connection carrying voice data voice call over a public switched telephone network may be performed by inquiring a status of an activity of at least one component in the terminal device.

The communication session may be established with a web real-time communication, webRTC, technology.

According to a second aspect, a terminal device is provided, the terminal device comprising: at least one processor; at least one memory including computer program code; the at least one memory and the computer program code configured to, with the at least one processor, cause the terminal device to perform: determine if the terminal device executes an active communication connection carrying voice data over a public switched telephone network; inactivate, in response to a determination that the terminal device executes the active communication connection carrying voice data, a voice portion of a communication session over a communication network implementing IP based communication; activate, in response to a determination that the terminal device does not execute the active communication connection carrying voice data, the voice portion of the communication session over the communication network implementing IP based communication.

The terminal device may be configured to perform an inactivation of the voice portion of the communication session over the communication network implementing IP based communication by muting of a voice channel in the communication session.

Alternatively or in addition, the terminal device the terminal device may be configured to perform an inactivation of the voice portion of the communication session over the communication network implementing IP based communication by disabling a voice channel in the communication session.

The terminal device may be configured to perform the determination if the terminal device executes an active communication connection carrying voice data voice call over a public switched telephone network by inquiring a status of an activity of at least one component in the terminal device.

The terminal device may be configured to establish the communication session with a web real-time communication, webRTC, technology.

According to a third aspect, a computer program product for managing a communication of a terminal device is provided, which, when executed by at least one processor, cause the terminal device to perform the method as described above.

According to a fourth aspect, a system for managing a communication of a terminal device is provided, the system comprising: a first terminal device and a second terminal device, wherein the system: the first terminal is configured to: determine if an active communication connection carrying voice data over a public switched telephone network is executed to the second terminal device; inactivate, in response to a determination that the active communication connection carrying voice data is executed to the second terminal device, a voice portion of a communication session over a communication network implementing IP based communication; activate, in response to a determination that the active communication connection carrying voice data is not executed to the second terminal device, the voice portion of the communication session over the communication network implementing IP based communication.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
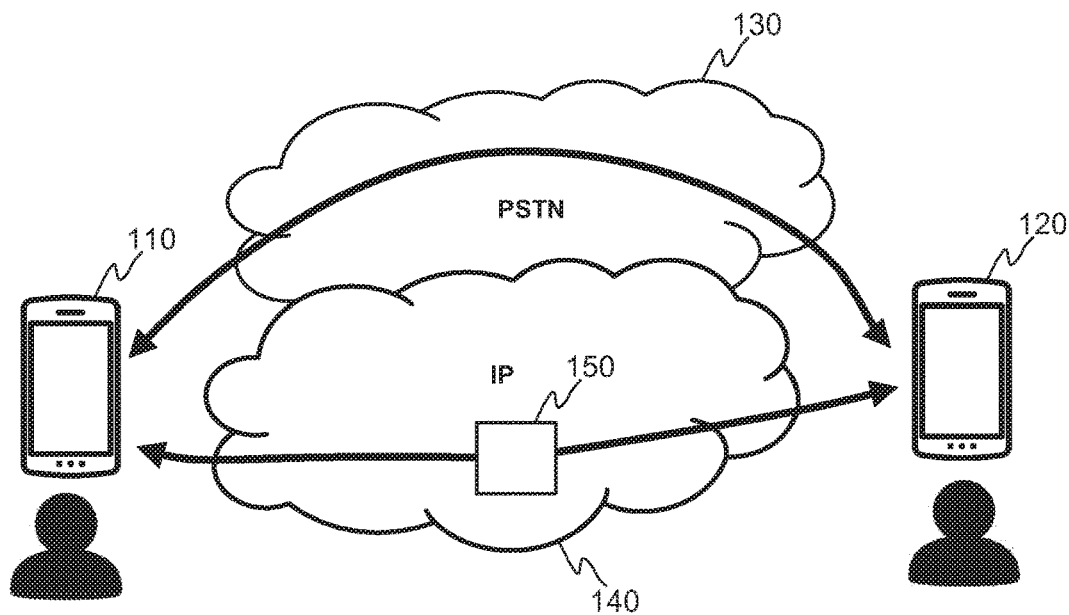
FIG. 1 illustrates schematically an example of a communication system according to the invention.

FIG. 1 illustrates schematically at least some aspects of a communication system according to the present invention. In the communication environment a first terminal device 110 and a second terminal device 120 are suitable for communicating with each other. The terminal devices 110, 120 are illustrated as smart phones in FIG. 1, but they are not only limited to that type of terminal devices, but any other device, such as a PC, a laptop computer, a tablet, may be applied to. For describing at least some aspects of the present invention the terminal devices 110, 120 are configured so that they may be communicate with each other over different communication networks. A first communication network may be so-called public switched telephone network (PSTN) covering at least networks implemented with telephone lines, fiber optic cables, microwave transmission links, cellular networks, communications satellites, and undersea telephone cables, all interconnected by switching centers, thus allowing the terminal devices 110, 120 to communicate with each other. In order to describe the present invention it is mainly referred to an implementation in which the first communication network 130 is a mobile communication network. In the context of the present invention the second communication network 140 is a network implementing Internet protocol (IP) based communication between the parties. Specifically speaking the IP based communication network 140 may be configured to implement so-called web real-time communication (WebRTC) technology. In order to achieve this a network node 150, such as a web server, may be configured to execute a webRTC service through which at least part of the communication may be implemented. This may e.g. refer to an establishment of the communication session over a webRTC technology, or an execution of the communication itself.

Figure 2:
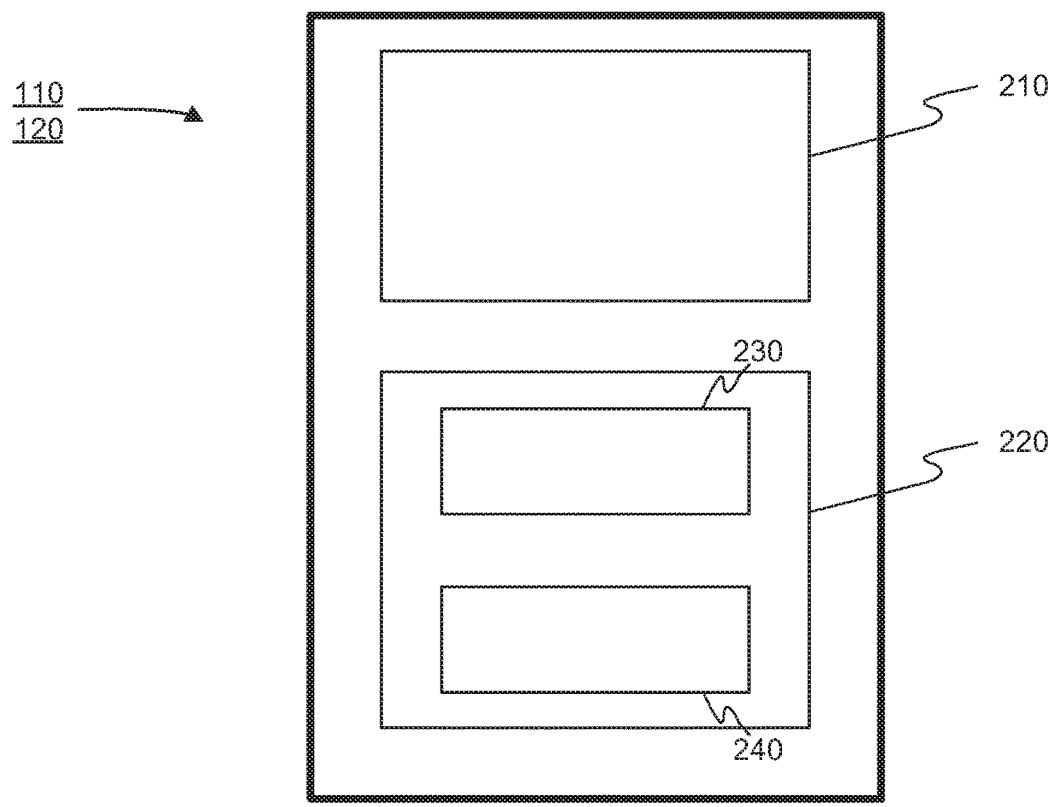
FIG. 2 illustrates schematically an example of a terminal device according to an embodiment of the invention.

FIG. 2 illustrates schematically an example of the terminal device 110, 120 according to an embodiment of the invention. FIG. 2 illustrates aspects of the terminal device 110, 120 as functional elements for providing information to understand at least some aspects of the present invention in more detail. In a functional sense the terminal device 110, 120 comprises a first communication portion 210 for managing a communication connection carrying voice data to the first communication network 130 and a second communication portion 220 for managing a communication session to the second communication network 140. Regarding the communication connection to the first communication network 130 the first communication portion 210 may comprise necessary hardware and software elements, which in cooperation together, enable conducting a voice call to another terminal device 110, 120 over the first communication network 130. Further, regarding the communication session to the second communication network 140 the second communication portion 220 may comprise necessary hardware and software elements, which in cooperation together, enable conducting a communication session to another terminal device 110, 120 over the second communication network 140. The communication session conducted over the second communication network 140 with the webRTC technology may comprise a voice connection and a multimedia connection. Hence, the second communication portion 220 of the terminal device 110, 120 may comprise two sub-functionalities for the communication session conducted over the second communication network 140 i.e. a first sub-functionality 230 for controlling the voice connection over the second communication network 140 and a second sub-functionality 240 for controlling the multimedia connection over the second communication network 140. Herein, the multimedia connection may refer to a connection over which multimedia content is delivered. Some non-limiting examples of the multimedia content may be images, video (either real-time or non-real-time), documents, textual messages, and so on. Moreover, the terminal device 110, 120 may comprise an administration functionality (not shown in FIG. 2) which is configured to monitor an operation of the first communication portion 210 and the second communication portion 220. The monitoring may comprise a determination if a connection, such as a voice call connection is established by the first communication portion 210 to a first communication network 130. Further, the terminal device 110, 120 may comprise a further functionality as the administrative functionality by means of which the terminal device 110, 120 may perform control operations with respect to connections, or at least some aspects of them, established, or to be established, by the first communication portion 210 or the second communication portion 220 or the both. The mentioned administrative functionalities may be implemented by executing computer program with a processor which causes a generation of instructions to cause the terminal device 110, 120 to operate accordingly. Depending on an implementation of the terminal device 110, 120 the first communication portion 210 and the second communication portion 220 may also execute mutual control functions. In the context of the present invention the terminal device 110, 120 may be implemented as one entity or it may comprise at least two entities, such as devices. For example, one entity may be configured to manage voice connection over PSTN, whereas the other entity is a device configured to manage IP based communication. In case of the plurality of entities control functions may be established for managing a cooperation between these two.

Now, some aspects of the present invention are described in a communication environment as schematically depicted in FIG. 1, wherein the terminal devices 110, 120 have the functionalities as described in the context of FIG. 2. Moreover, a functionality for managing a communication of the terminal device 110, 120 is implemented in the terminal device 110, 120 in question. Some aspects of the functionality are described as method steps in FIG. 3. A starting point for the method is that the terminal device 110, 120 in which at least some of the method steps are performed may or may not have an active communication connection carrying voice data to another party, such as to another terminal device 110, 120. According to the method it is determined 310 if the terminal device 110, 120 executes an active communication connection carrying voice data over a public switched telephone network 130. The determination 310 is advantageously performed in response to a receipt of an indication that a communication session is to be established over a communication network implementing IP based communication 140 i.e. the second communication network 140. For example, the indication may be provided by a user of the terminal device 110, 120 in question. According to the present invention if an outcome of the determination is that the terminal device 110, 120 executes the active communication connection carrying voice data the method may comprise a step of inactivating 320 a voice portion of a communication session over IP based network 140. In other words, there may be executed a procedure in the terminal device 110, 120 which instructs an inactivation 320 of the voice portion in the communication session over IP based network 140. The inactivation of the voice portion may refer to a solution that the voice portion is muted in the communication session over IP based network 140 i.e. even if the communication session comprises a channel for transferring voice data the voice data is muted between the parties. Alternatively, the inactivation of the voice portion may refer to a solution that the channel for transferring voice data in the communication session is disabled, i.e. not established at all, during the communication session over IP based network 140. On the other hand, if the outcome in step 310 is that there is no active communication connection carrying voice data over PSTN 130 there may be executed a procedure in the terminal device 110, 120 instructs an activation 330 of the voice portion of the communication session over the communication network 140 implementing IP based communication. The activation may refer to action in which it is actively indicated that the voice portion is to be used, but it may also refer to a procedure in which the terminal device 110, 120 allows an establishment of the communication session according to normal procedure. This may e.g. refer to an establishment of a communication session with webRTC technology in which both the voice channel and the multimedia channel are activated, i.e. established.

The result of the above described method is that the terminal device 110, 120 communicates with another terminal device 110, 120 over a connection carrying voice data and over another connection carrying multimedia wherein the connection carrying voice data is established either over PSTN 130 or over a communication network 140 implementing IP based communication.

Figure 3:
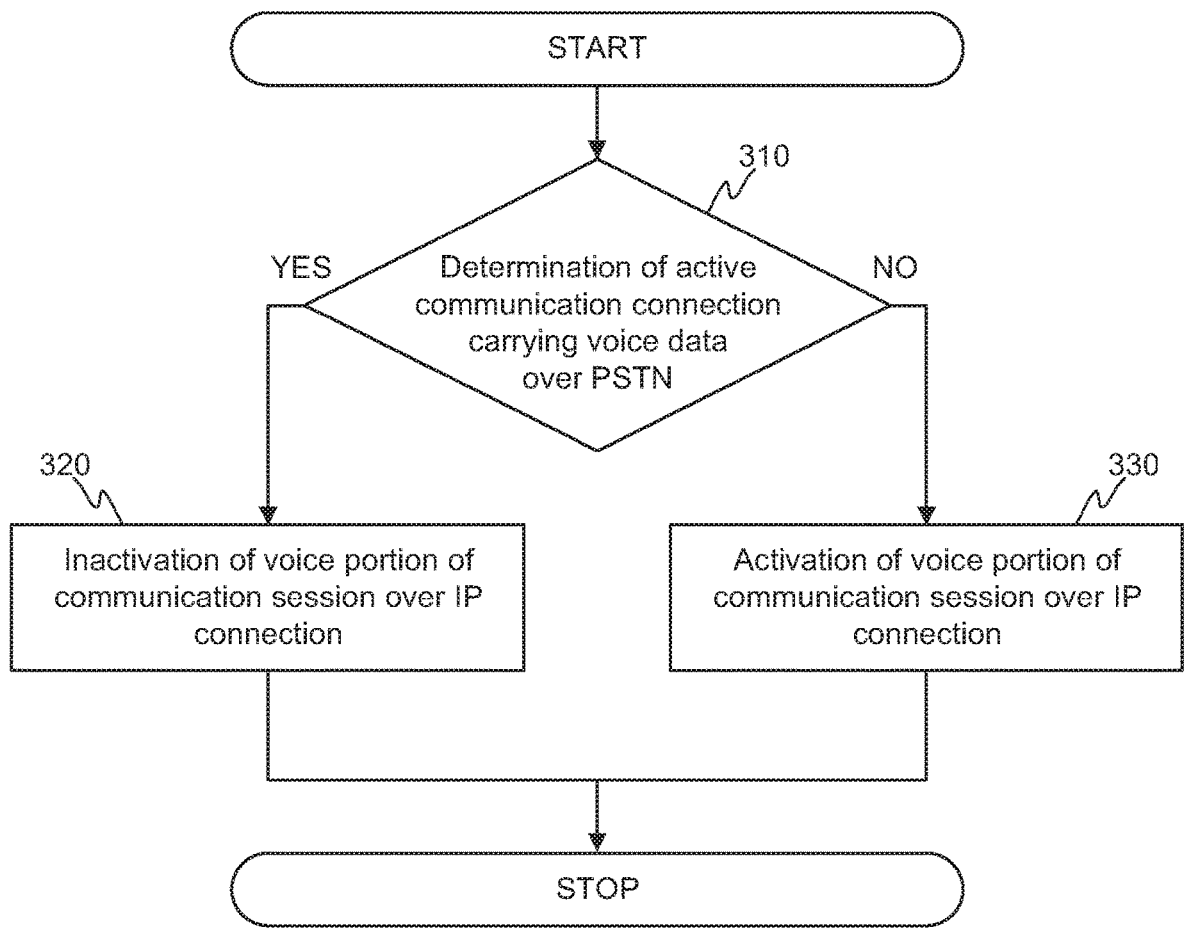
FIG. 3 illustrates schematically a method according to an embodiment of the invention.

The communication session over the communication network 140 implementing IP based communication may be carried out using a network node 150, such as a web server, at least in part in the context of the communication session. The network node 150 may be configured to perform at least some operations with respect to the communication session, such as operations for establishing the communication session. According to an embodiment of the invention the terminal device 110, 120 establishing the communication session may generate a request to the network node 150, the request indicating that the communication is to be established to the other terminal device 110, 120. The request may also carry authentication information, such as credentials, for accessing the network node 150 and/or the service for establishing the communication session, for example. Additionally, the request may also carry information on a type of communication session to be established, quality requirements for the communication session and/or communication technique related parameters, for instance. The network node 150 may be configured to, in response to the receipt of the request, to perform predetermined operations, such as checking the authentication information if applicable, and establish a communication session in the service. Additionally, it may provide a link to the communication session and return it to the terminal device 110, 120 requesting the establishment of the communication session. In response to a receipt of the link to the established communication session the terminal device 110, 120 may, e.g. through an interaction with a user, be configured to transmit an invitation comprising the link to the communication session to the other terminal device 110, 120. The other terminal device 110, 120 may be configured to open the link to the network node 150 and this may be detected by the terminal device 110, 120 which requested the communication session. According to an embodiment of the invention the method as schematically illustrated in FIG. 3 may be performed at this stage so as to establish the communication session with necessary features. According to another embodiment of the invention the method as schematically illustrated in FIG. 3 may be repeatedly performed during the communication session, especially if an outcome of a previous determination is that there is no active communication connection carrying voice data voice call over the public switched telephone network 130. In this manner it is possible to optimize the communication and a quality of the communication throughout the communication session.

According to still further embodiment of the invention a connection quality monitoring procedure may be established. For example, in case a first determination indicates that there is no active communication connection carrying voice data over a public switched telephone network 130 the communication session comprising both the voice channel and the multimedia channel is established over the communication network 140 implementing IP based communication. A set of quality parameters may be monitored e.g. on the voice channel from which a value representing a quality of the voice channel over the communication network 140 may be generated. The value may e.g. be compared to a reference value, and in accordance with the comparison it may be determined if the quality of the voice channel meets requirements or not. In case the requirements are not met the terminal device 110, 120 may be configured to initiate an establishment of a communication connection carrying a voice data to the other terminal device 110, 120 and the connection may be established. Now, when the method according to the invention is again performed it is determined that there is an active communication connection carrying voice data over the PSTN 130 and as a result the voice portion in the communication session over the communication network 140 implementing IP based communication may be inactivated. In this manner a quality in a transmission of the voice data may be maintained at a required level.

The determination 310 if there is an active communication connection carrying voice data over PSTN 130 may be performed by the terminal device 110, 120 with an internal procedure. Entities, such as different components, in the terminal devices 110, 120 may comprise interfaces over which it is possible to inquire state of an entity in question. For example, it may pre-determined which components are active during a voice call, or specifically during a voice call over PSTN, and during the determination 310 it may be inquired if one or more these components are active i.e. a status of activity of one or more components is inquired. In response to the detection of one or more active components it may be determined that an active communication connection over PSTN is in place and the process may be continued accordingly. On the other hand, it may be determined that no component indicating the active communication connection over PSTN is active and the process may be continued based on this detection. As a non-limiting example, one entity whose activity may be determined over the interface with an inquiry may be a microphone. If it is active, then it may be assumed that an active communication connection is in place. Another non-limiting example is that the inquiry is performed towards a communication interface, such as a modem, configured to manage the communication with the PSTN network and through the inquiry it may be determined if the communication interface is active, and based on this to perform the determination 310. In some embodiment of the invention the terminal device 110, 120 may be configured so that it comprises a specific interface from which it may be inquired if the terminal device in question has an active voice call connection in place.

Figure 4:
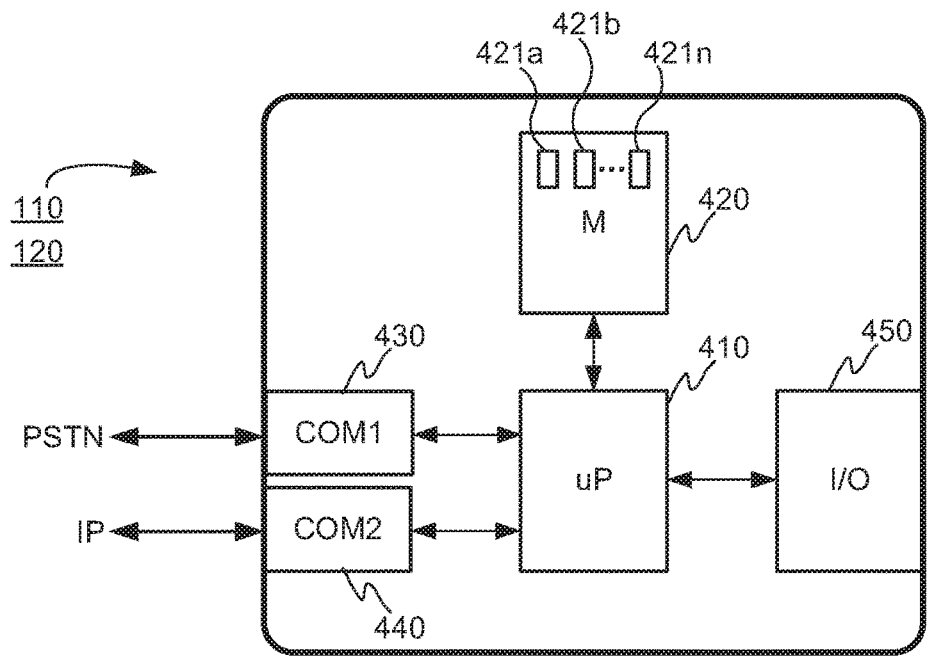
FIG. 4 illustrates schematically another example of a terminal device according to an embodiment of the invention.

An example of a terminal device 110, 120 is schematically illustrated in FIG. 4. The terminal device 110, 120 may be configured to implement at least part of the method for managing a communication of the terminal device 110, 120 in question as described. The execution of the method, or at least some portion of it, may be achieved by arranging a processor 410 to execute at least some portion of computer program code 421a-421n stored in a memory 420 causing the processor 410, and, thus, the terminal device 110, 120 to implement one or more method steps as described. In other words, the processor 410 may be arranged to access the memory 420 and to retrieve and to store any information therefrom and thereto. Moreover, the processor 410 may be configured to control a communication through one or more communication interface 430, 440 for accessing both the PSTN 130 and the communication network 140 implementing IP based communication. Hence, the communication interfaces 430, 440 may be arranged to implement, possibly under control of the processor 410, corresponding communication protocols, such as an IP, in question. Further, the terminal device 110, 120 in question may comprise one or more input/output devices 450 for inputting and outputting information. Such input/output devices may e.g. be keyboard, buttons, touch screen, display, loudspeaker, microphone camera and so on. In some implementation of the terminal device 110, 120 at least some of the input/output devices may be external to the terminal device 110, 120 and coupled to it either wirelessly or in a wired manner. For sake of clarity, the processor 410 herein refers to any unit or a plurality of units suitable for processing information and control the operation of the terminal device 110, 120 in general at least in part, among other tasks. The mentioned operations may e.g. be implemented with a microcontroller solution with embedded software. Similarly, the invention is not limited to a certain type of memory 420, but any memory unit or a plurality of memory units suitable for storing the described pieces of information, such as portions of computer program code and/or parameters, may be applied in the context of the present invention. Generally speaking the computer program code, and any other data such as the parameters, may be stored in one or more non-transitory computer-readable storage media, having computer-executable instructions embodied thereon in the form of the computer program code.

As becomes clear from above some aspects of the present invention may relate to a system for managing a communication of a terminal device 110, 120. The system comprises at least a first terminal device 110 and a second terminal device 120, wherein the system the first terminal 110 is configured to: determine 310 if an active communication connection carrying voice data over a public switched telephone network 130 is executed to the second terminal device 120; inactivate 320, in response to a determination that the active communication connection carrying voice data is executed to the second terminal device 120, a voice portion of a communication session over a communication network 140 implementing IP based communication; activate 330, in response to a determination that the active communication connection carrying voice data is not executed to the second terminal device 120, the voice portion of the communication session over the communication network 140 implementing IP based communication. The system may also comprise a number of communication networks 130, 140 suitable to implement technologies by means of which the communication connection and the communication session may be established. Naturally, the mentioned networks may comprise a number of network elements, such as web servers, for implementing at least some processes for establishing the present invention.

In the description of the present invention it is mainly referred to a communication connection carrying voice data over PSTN and a communication session over IP connection. However, the communication connection carrying voice data over PSTN shall also be understood to cover a communication connection over a native Voice over LTE or a communication connection over Voice over Wi-Fi. It is admitted that both these communication connections are actually implemented over IP based communication, but they are distinguishable from the WebRTC communication and, hence, the present invention may also be applied in such a communication environment.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for managing a communication of a first terminal device to a second terminal device, the method, performed by the first terminal device in response to a receipt of an indication that a communication session is to be established to the second terminal device over a communication network implementing IP-based communication, comprising:
    determining, based on a status of an activity determined by inquiring the status of the activity of at least one component in the first terminal device, that the first terminal device is currently executing a voice call to the second terminal device over a public-switched telephone network;
    in response to a determination that the first terminal device is currently executing the voice call to the second terminal device over the public-switched telephone network, establishing the communication session over the communication network implementing the IP-based communication by only activating a multimedia portion of the communication session, and inactivating a voice portion of the communication session over the communication network implementing the IP-based communication by one of (i) muting the voice portion of the communication session, and (ii) disabling a voice channel that transfers voice data in the communication session; and
    in response to a determination that the first terminal device is not currently executing the voice call to the second terminal device over the public-switched telephone network, establishing the communication session over the communication network implementing the IP-based communication by activating both the voice portion of the communication session and the multimedia portion of the communication session.

2. The method of claim 1, wherein the inactivating the voice portion of the communication session over the communication network implementing the IP-based communication comprises muting the voice channel in the communication session.

3. A non-transitory, computer-readable medium on which is stored a computer program for managing a communication of a terminal device, and which, when executed by at least one processor, cause the terminal device to perform the method according to claim 2.

4. The method of claim 1, wherein the inactivating the voice portion of the communication session over the communication network implementing the IP-based communication comprises disabling the voice channel in the communication session.

5. A non-transitory, computer-readable medium on which is stored a computer program for managing a communication of a terminal device, and which, when executed by at least one processor, cause the terminal device to perform the method according to claim 4.

6. The method of claim 1, wherein the communication session is established with a web real-time communication (webRTC) technology.

7. A non-transitory, computer-readable medium on which is stored a computer program for managing a communication of a terminal device, and which, when executed by at least one processor, cause the terminal device to perform the method according to claim 6.

8. A non-transitory, computer-readable medium on which is stored a computer program for managing a communication of a terminal device, and which, when executed by at least one processor, cause the terminal device to perform the method according to claim 1.

9. A terminal device comprising:
    at least one processor;
    at least one memory including computer program code;
    the at least one memory and the computer program code configured to, with the at least one processor, cause the terminal device, in response to a receipt of an indication that a communication session is to be established to another terminal device over a communication network implementing IP-based communication, to:
        determine, based on a status of an activity determined by inquiring the status of the activity of at least one component in the terminal device, that the terminal device is currently executing a voice call to the other terminal device over a public-switched telephone network,
        in response to a determination that the terminal device is currently executing the voice call to the other terminal device over the public-switched telephone network, establish the communication session over the communication network implementing the IP-based communication by only activating a multimedia portion of the communication session, and inactivate a voice portion of the communication session over the communication network implementing the IP-based communication by one of (i) muting the voice portion of the communication session, and (ii) disabling a voice channel that transfers voice data in the communication session, and
        in response to a determination that the first terminal device is not currently executing the voice call to the second terminal device over the public-switched telephone network, establish the communication session over the communication network implementing the IP-based communication by activating both the voice portion of the communication session and the multimedia portion of the communication session.

10. The terminal device of claim 9, wherein the terminal device is configured to perform the inactivating the voice portion of the communication session over the communication network implementing the IP-based communication by muting of the voice channel in the communication session.

11. The terminal device of claim 9, wherein the terminal device is configured to perform the inactivating the voice portion of the communication session over the communication network implementing the IP-based communication by disabling the voice channel in the communication session.

12. The terminal device of claim 9, wherein the terminal device is configured to establish the communication session with a web real-time communication (webRTC) technology.

13. A system for managing a communication of a terminal device, the system comprising:
    a first terminal device; and
    a second terminal device,
    wherein the first terminal device is, in response to a receipt of an indication that a communication session is to be established to the second terminal device over a communication network implementing IP-based communication, configured to:
        determine, based on a status of an activity determined by inquiring the status of the activity of at least one component in the first terminal device, that the first terminal device is currently executing a voice call over a public-switched telephone network is executed to the second terminal device, in response to a determination that the first terminal device is currently executing the voice call to the second terminal device over the public-switched telephone network, establish the communication session over the communication network implementing the IP-based communication by only activating a multimedia portion of the communication session, and inactivate a voice portion of the communication session over the communication network implementing the IP-based communication by one of (i) muting the voice portion of the communication session, and (ii) disabling a channel that transfers voice data in the communication session, and in response to a determination that the first terminal device is not currently executing the voice call to the second terminal device over the public-switched telephone network, establish the communication session over the communication network implementing the IP-based communication by activating both the voice portion of the communication session and the multimedia portion of the communication session.

\* \* \* \* \*